United States Patent [19]

Hamner et al.

[11] Patent Number: 4,909,436
[45] Date of Patent: Mar. 20, 1990

[54] WET ATMOSPHERE GENERATION APPARATUS

[75] Inventors: Richard M. Hamner; Janice K. Allen, both of Huntsville, Ala.

[73] Assignee: The United States of America as represented by the Administrator of the National Aeronautics and Space Administration, Washington, D.C.

[21] Appl. No.: 283,092

[22] Filed: Dec. 12, 1988

[51] Int. Cl.⁴ ............................................. B01F 3/02
[52] U.S. Cl. ................................. 236/44 A; 165/20; 236/94; 417/190
[58] Field of Search ................. 236/44 A, 44 R, 94; 165/20; 261/DIG. 34; 62/171; 417/190

[56] References Cited

U.S. PATENT DOCUMENTS

| | | | |
|---|---|---|---|
| 2,628,481 | 2/1953 | Scofield et al. | 236/44 R |
| 2,815,305 | 12/1957 | Ipsen | 236/44 R |
| 3,532,270 | 10/1970 | Schoen, Jr. | 236/44 R |
| 3,628,555 | 12/1971 | Nagano et al. | 236/44 A |
| 4,616,777 | 10/1986 | Fisher et al. | 62/171 X |

*Primary Examiner*—William E. Wayner
*Attorney, Agent, or Firm*—William J. Sheehan; John R. Manning; Jerry L. Seemann

[57] ABSTRACT

The invention described herein relates to an apparatus for providing a selectively humidified gas to a camera canister (12) containing cameras and film used in space. A source of pressurized gas (leak test gas 26 or motive gas 21) is selected by a valve (30), regulated to a desired pressure by a regulator (34), and routed through an ejector (46) (venturi device). A regulated source of water vapor in the form of steam from a heated reservoir (18) is coupled to a low pressure region (50) of the ejector (46) which mixes with high velocity gas flow through the ejector (46). This mixture is sampled by a dew point sensor (14) to obtain dew point thereof (ratio of water vapor to gas) and the apparatus adjusted by varying gas pressure or water vapor to provide a mixture at a connector (78) having selected humidity content.

12 Claims, 2 Drawing Sheets

WET ATMOSPHERE GENERATION APPARATUS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates generally to devices for humidifying gases, and more particularly to such a device which selectively humidifies a gas with a high degree of precision.

BACKGROUND OF THE INVENTION

When using some types of photographic film in space, it is desirable that the film be provided with an inert, humidified atmosphere. This is especially true of specialized film such as that used in the Wide Field Cameras aboard the Astro-1 Shuttle Mission scheduled to be launched by NASA. This film is of the type used for photographing diffuse sources of ultraviolet radiation and has an emulsion which requires a selected range of relative humidity in order to prevent it from being adversely affected or possible ruined. For providing such an environment, a camera canister is constructed having provisions adapted to regulate temperature and pressure of the interior of the canister within a selected range. As relative humidity changes with variations of temperature and pressure, it is necessary to keep the range of temperature within a range which, at a depressed temperature, will not cause saturation and condensation of the water vapor within the canister, and which, at an elevated temperature, will not cause a condition which is too dry for the film. Likewise, pressure of the canister must be regulated to prevent a condition from occurring which is too humid or dry. In this instance, an increase of pressure causes the relative humidity to increase proportionally, and a decrease of pressure causes a proportional decrease of relative humidity. The upshot of this is that not only must the canister containing the film and camera be temperature and pressure regulated, but the atmosphere used to charge the canister prior to flight must be generated at a pressure which approximates that of the pressure of the canister while it is in use. Further, the atmosphere used to charge the canister may not be pressurized and stored in a pressure bottle or vessel because, for a given relative humidity, the pressure at which saturation and condensation of the water vapor occurs therein is prohibitively low. This means, for example, that if a gas mixture having a relative humidity of 20% at one atmosphere (14.7 PSI) is stored or shipped in a pressure bottle, it can be pressurized to no more than five atmospheres (73.5 PSI) before saturation and condensation of the water vapor will begin.

Accordingly, it is an object of the present invention to provide an apparatus which enables a sealed canister containing cameras and film to be charged with a selectively humidified inert gas, with a high degree of control being established over the quantity of water vapor provided to the gas mixture and the pressure of the mixture. Further, this invention also provides a convenient way to charge the canister with a leak-revealing gas so that it may be inspected for leaks and for purging the canister of leak-revealing gas prior to charging with the water vapor/inert gas mixture.

SUMMARY OF THE INVENTION

An apparatus is constructed wherein a primary stream of gas of selected pressure is made to occur in a tube coupled to a device having a constriction therein. This constriction generates a low pressure region downstream thereof, and a controllable source of secondary gas is coupled to the low pressure region. A dew point sensor is coupled to the tube downstream of the low pressure region and serves to detect and indicate the dew point of the mixture. This dew point indication is used to manually regulate pressure of the primary gas and flow of secondary gas as necessary to achieve the desired dew point of the mixture. This mixture of gases is selectively distributed to an external container by a distribution valving circuit positioned downstream of the primary/secondary ratio detector.

DESCRIPTION OF THE PREFERRED EMBODIMENT

Figure 1:
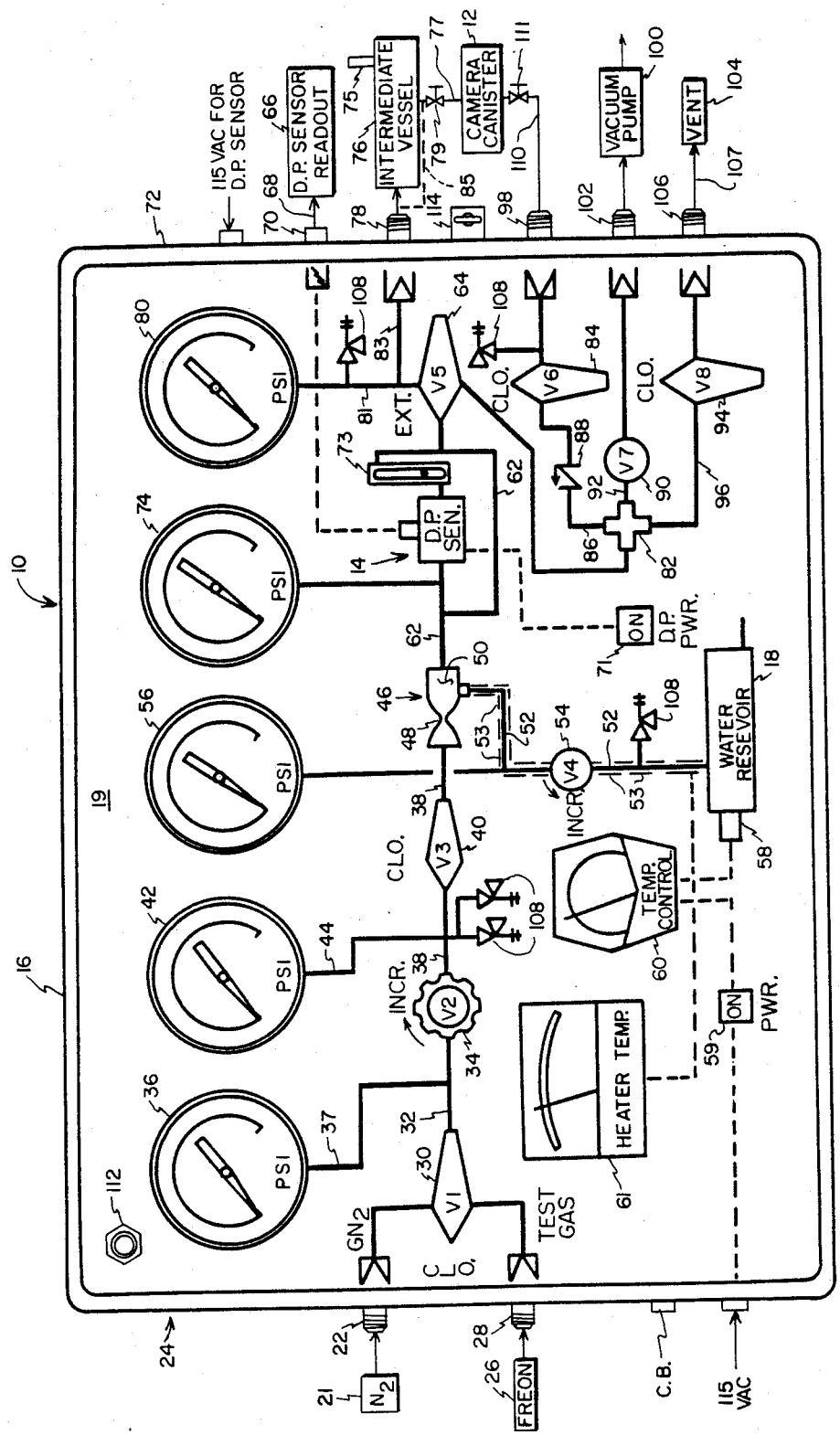
FIG. 1 is a partially schematic planar view of the present invention.

Apparatus 10 is used to generate and direct, in a controlled manner, a selected atmosphere comprising a mixture of gases for use in a canister 12. The apparatus, as shown in FIG. 1, provides a controlled wet atmosphere and includes flow control and pressurization means to control the ratio of gases in canister 12. Typically, canister 12 may enclose camera, film, or any other device or process which must exist in a controlled atmosphere. To provide the requisite atmosphere for cameras and film for the Astro-1 Shuttle Mission (ultraviolet cameras and film), an inert gas such as $N_2$ is mixed with water vapor in a predetermined ratio. This ratio is measured by a dew point sensor 14 and adjusted in accordance with this measurement. Additionally, apparatus 10 is provided with fittings and appropriate valves which allow a leak-detecting gas to be introduced into canister 12 in order to detect leaks therein.

Figure 2:
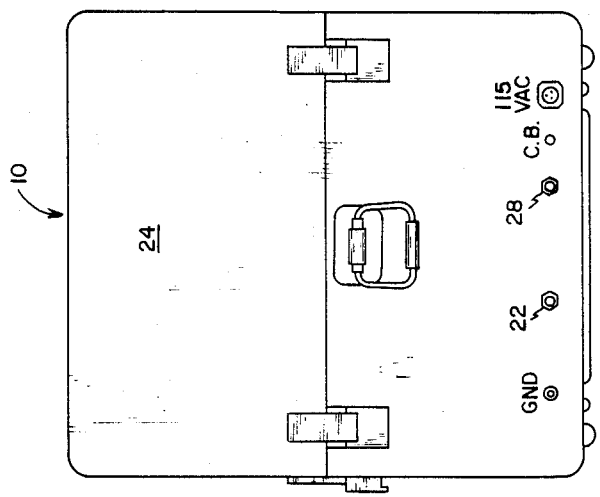
FIG. 2 is a planar view of one side of the present invention showing connections thereto.

Apparatus 10 is constructed having an enclosure 16 (FIGS. 1, 2, and 3) which houses a heated, air-tight water vessel or reservoir 18 and is provided with a storage compartment 20 for storing necessary hoses, connectors, and cables for its operation. A front panel 19 (FIG. 1) supports a variety of pressure and temperature gauges along with valves and regulators which control the operation of apparatus 10. Pressure tubing, which connects these gauges, valves, and regulators is schematically indicated as shown on panel 19 so that an operator may readily ascertain the operating condition apparatus 10 is configured for at any point during its operation.

Initially, a source 21 of motive primary gas, such as gaseous nitrogen ($GN_2$), is coupled to fitting 22 (FIGS. 1 and 2) on side 24 of apparatus 10. If leaks are to be tested for, a source of leak-detecting gas 26, such as Freon®, a gas of the class of clorofluorocarbons, may be coupled to fitting 28. These gas sources are regulated at the source to a maximum of 400 PSI, with source 21, in most cases, requiring a minimum pressure of 100 PSI and source 26 requiring a minimum pressure of 40 PSI. These sources are coupled to a three-position valve 30 which is selectable between a closed position (shown) and either of sources of gas 21 or 26. A pressure gauge 36 coupled via line 37 to line 32 indicates the supply pressure of sources of gas 21 or 26. The selected gas is routed via pressure line 32 (schematically shown) to a pressure regulator 34. Regulator 34 regulates the downstream pressure of the stream of gas flowing through apparatus 10.

The regulated gas exits regulator 34 via line 38 and is coupled to a two-position valve 40. This valve is used to switch "on" or "off" the flow of gas through apparatus 10. Gauge 42 is coupled via line 44 to line 38 from regulator 34 to indicate the regulated pressure of gas entering valve 40.

Next, the regulated gas enters an ejector 46 which is basically a conventional DeLaval nozzle or venturi. Ejector 46 is selected to have an orifice or constriction 48 which is approximately 0.030", and when line 38 is regulated to its operating pressure of approximately 90 PSI, a supersonic stream of gas issues therethrough. This generates a low pressure region 50 in ejector 46 having a vacuum of approximately 23" to 24". This vacuum is coupled to water reservoir 18 via line 52 and regulator 54.

Reservoir 18 is provided with an electrically powered, thermostatically controlled heater 58 which is activated by power switch 59 and controlled by temperature control 60. Temperature control 60 is used to select a temperature of water in reservoir 18 so that the pressure in the reservoir is greater than the full 23" to 24" vacuum developed by ejector 46. This temperature is approximately 140° F. to 150° F. at 23" to 24" vacuum. This allows positive pressure of steam to build up in reservoir 18, with this pressurized steam being supplied via regulator 54 to low pressure region 50 of ejector 46 where it is mixed with the supersonic stream of gas. In practice, regulator 54 would be only partially opened, as a fully open position would provide an excess of water vapor to ejector 46. A gauge 56 coupled to line 52 indicates pressure of steam in reservoir 18 offset by the regulated ejector suction pressure. Line 52 is provided with a strip heater 53 wrapped therearound and electrically coupled to power switch 59, with this heater being preset to approximately 185° F. As there is an initial lag and overshoot when switched "on," the temperature of heater 53 may be monitored by pyrometer 61. Heater 53 ensures that steam passing through line 52 will not condense and pass condensate to ejector 46, which would cause fluctuations in the $N_2$/water vapor mixture. In this manner, the combination of positive vapor pressure in reservoir 18 and the suction generated by ejector 46 ensures a positive flow of water vapor, which is regulated or controlled by regulator 54, to ejector 46 where it is thoroughly mixed with the supersonic motive gas.

After leaving ejector 46, the mixture of gas and water vapor is routed via line 62 to a three-position valve 64. A dew point sensor 14 having a readout 66, which is coupled via cable 68 to plug 70 on side 72 of enclosure 10, is coupled to line 62 in a parallel configuration with valve 64 and is used to detect the dew point, or ratio of water vapor to primary gas at a specific temperature and pressure, in the mixture leaving ejector 46. A flow meter 73 coupled downstream of sensor 14 indicates the rate of flow of mixture therethrough. Gauge 74 coupled to line 62 indicates pressure of mixture entering sensor 14. Valve 64, in addition to shutting off flow of mixture, is used to direct the flow either directly to an intermediate vessel 76 coupled to fitting 78 (FIGS. 1 and 3) or to a four-way union 82. Vessel 76 is provided with a vent 75 which is restricted so that atmospheric pressure is maintained therein, and a gauge 80 coupled to valve 64 via line 81 indicates pressure in line 83 and intermediate vessel 76. Union 82 simultaneously routes flow of mixture to/from two-position valve 84 via line 86 and check valve 88, a vacuum regulator 90 via line 92, and another two-position valve 94 via line 96. Union 82, valves 84 and 94, and regulator 90 form a distribution circuit which accepts the pressurized mixture from camera canister 12 via fitting 98 (FIG. 1) and routes this mixture either to a vacuum pump 100 coupled via fitting 102 and vacuum regulator 90 or to a vent 104 coupled via fitting 106. Thusly, a flow of mixture or gas can be made to occur through camera canister 12 by a combination of pressure from ejector 46 and vacuum from vacuum pump 100. This is useful when it is desired to flush or purge canister 12 of ambient or leak-indicating gases.

Dew point sensor 14 is a conventional condensation dew point hygrometer, model number Series 110, manufactured by General Eastern Corporation. This type of dew point sensor uses a thermoelectric cooler/heater having a precision mirror coupled thereto, with a high intensity LED positioned to direct a beam of light onto this mirror. A photodetector monitors specular reflection from the mirror and is electrically coupled to an electrical bridge circuit having an optical offset built therein. Accordingly, a large bridge electrical output is developed when the mirror is dry, and a lower bridge output is developed when the mirror is coated with condensate (due to light scattering losses). When in the dry state, the bridge output is amplified and used to control current to the cooler, which cools the mirror toward the dew point. As dew forms on the mirror, the optical bridge is driven toward a balance point, reducing monitored specular light and causing current to the cooler to be reduced. A rate feedback loop in the amplifier ensures critical response, and the system stabilizes at a temperature at which a thin layer of dew or frost is maintained on the mirror. This temperature is monitored directly by a precision temperature measuring device embedded in the mirror and indicated by dew point sensor readout 66.

It is to be noted that safety valves 108 disposed to "blow off" excess pressure are connected into lines 38, 52, 81, and 86. This allows a build-up of pressure in regulated input line 32, water vapor line 52, mixture line 62, or pressure in the intermediate vessel due to a blockage or other malfunction to be safely vented before building up to the burst pressure of the components of apparatus 10 or camera canister 76.

In operation, a source 21 of gaseous $N_2$ having a regulated pressure between 100 and 400 PSI is coupled to fitting 22 on apparatus 10. In most cases, this source must have at least 100 PSI in order to overcome a slight pressure drop in regulator 34 and provide approximately 90 PSI to ejector 46. This causes a supersonic stream of motive gas to pass through orifice 48 of ejector 46, which is largely responsible for creating the vacuum condition in low pressure region 50 and efficient mixing of the gas and water vapor passing through ejector 46. If leaks in apparatus 10 or in external vessel 76 and camera canister 12 are to be tested for, a source 26 of Freon ® is coupled to fitting 28 and selected by valve 30. As stated, the pressure of this source must be between a maximum of 400 PSI and a minimum of 40 PSI.

In order to most efficiently test for leaks in canister 12 and introduce humidified N₂ therein with as little disassembly as possible, canister 12 and apparatus 10 are connected as diagrammatically shown in FIG. 1. Fitting 78 on side 72 of apparatus 10 is connected via intermediate vessel 76 and line 77 having a closure valve 79 to camera canister 12. A return line 110 from canister 12 having a second closure valve 111 is coupled to fitting 98 on apparatus 10. Vent fitting 106 on apparatus 10 is coupled by line 107 to a facility vent system 104.

To test canister 12 for leaks, the system external to apparatus 12 is slightly reconfigured. Intermediate vessel 76 is removed from the system, and a line 85 (dotted line) is connected directly from fitting 78 to valve 79. This allows the entire system to be pressurized above atmospheric pressure by being isolated from the ambient, which would not be possible with the vented intermediate vessel in the system. Valve 30 is then moved to the "test gas" position. This elects Freon ® as the gas to be forced through apparatus 10 and canister 12. With valve 40 closed, the pressure of the test gas is regulated by regulator 34 to approximately 16 PSI. Valve 40 in then opened, valve 64 is set to the "external" position, and valves 79, 111, 84, and 94 are opened, allowing the Freon ® to begin to purge any residual gases from canister 12 to the facility vent system 104. Once sufficient time has elapsed for Freon ® to have filled canister 12, valve 111 is closed, the pressure in canister 12 is allowed to stabilize to 16 PSI, and valve 79 is closed. A conventional halogen leak detector (not shown), as is used in the field of air-conditioning, is then used to inspect canister 12 and other components for leaks.

After the leak test is completed, valves 111, 94, and 84 are opened to allow the Freon ® to be vented through the facility vent system 104.

For charging canister 12 with humidified N₂, the system is reconfigured as shown in FIG. 1, and all valves of apparatus 10 are initially closed. Valves 79 and 111 on lines 77 and 110, respectively, are closed, trapping Freon ® at ambient pressure inside canister 12. Prior to charging canister 12, reservoir 18 is filled with approximately ¾ gallon of water via "fill" opening 112. At times, drain 114 (FIGS. 1 and 3) may be used to fill reservoir 18 by coupling a tube (not shown) thereto and using "fill" opening 112 as a vent. This prevents a vapor lock in reservoir 18 from preventing water flowing thereinto. Dew point sensor readout 66 is coupled via cable 68 to plug 70 and activated "on" by depressing power switch 71. Next, the various valves are positioned to generate the wet atmosphere for canister 12. Valve 64 is set to the "external vessel" position (Ext.), and valve 30 is set to the "GN₂" position. Source 21 of N₂ is regulated to approximately 100 PSI, and regulator 34 of apparatus 10 is adjusted to regulate the gas to approximately 90 PSI. Next, water vapor line 52, which is provided with heater 53 as described to prevent condensation of water vapor therein, is preheated by operating "on" power switch 59. Once operating temperature of heater 53 is attained or while it is being attained, water in reservoir 18 may be heated by setting heater control 60 to 160° F. As described, this temperature is sufficient to boil the water and generate a positive pressure in reservoir 18 when subjected to the depressed pressure of ejector 46. After the water in reservoir 18 reaches its desired temperature and pressure, valves 40, 79, and 111 are opened, and nitrogen (N₂) begins to flow through apparatus 10 and canister 12. Initially, Freon ® is purged from vessel 76 and canister 12, and then canister 12 is charged with humidified N₂. Flow meter 73, coupled to dew point sensor 14, is adjusted to provide a flow at a like pressure, as indicated by gauge 74, to dew point sensor 14 as that indicated on gauge 80. This flow through dew point sensor 14 is generally about 0.5 cubic feet per hour at atmospheric pressure (14.7 PSI). Regulator 54 is then opened to provide water vapor to the N₂ gas, forming a mixture adjusted to have a dew point of approximately 8° C. as observed on dew point readout 66. The indicated dew point temperature is observed by an operator, who then adjusts water vapor regulator 54 to increase or decrease flow of water vapor to ejector 46. Alternately, the operator may, in some instances, open water vapor regulator 54 a selected amount and vary pressure regulator 34 to achieve the desired 8° dew point in the mixture. At this dew point, the atmosphere in canister 12 will have a relative humidity of 15% at 40° C. For use in space, canister 12 would be charged to approximately one atmosphere (14.7 PSI) and be provided with an environment wherein the temperature is controlled between 15° C. and 35° C. At these temperatures, the relative humidity is 63% and 20%, respectively. It is necessary to maintain the relative humidity of canister 12 within these limits because at greater than 63% relative humidity, the film emulsion begins to absorb moisture and become tacky, which would cause it to jam a camera, stick to itself, or otherwise create problems, and at less than 20% relative humidity, the film emulsion becomes brittle and is subject to static electricity discharges.

Figure 3:
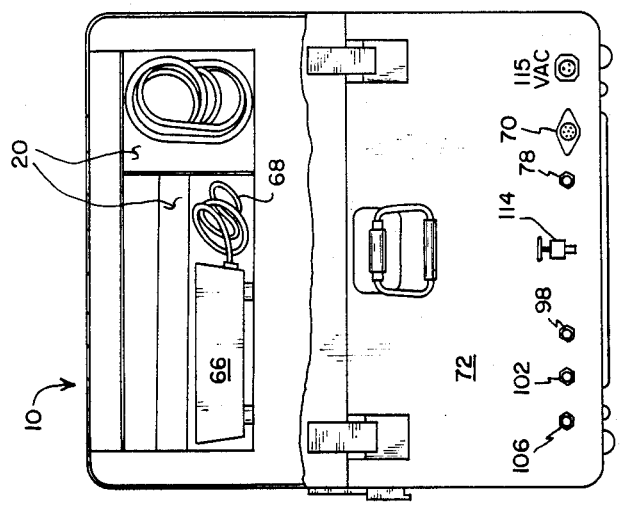
FIG. 3 is a planar view of an opposite side of the present invention showing connections thereto and a storage compartment therein.

After flow meter 73 is adjusted as described to provide flow through dew point sensor 14, vacuum pump 100 is energized, and vacuum valve 90 is used to regulate pressure in canister 12 to approximately 14.5 PSI as mixture is drawn by vacuum pump 100 through the system. Mixture exiting from pump 100 is monitored by the halogen leak detector, and when the Freon ® level falls to below $10^{-4}$ standard cubic centimeters per second, canister 12 and vessel 76 are considered purged of Freon ® and filled with N₂ having a humidity which is protective as long as the temperature is held within the above stated range. At this point, valves 111 and 79 are closed, in that order, sealing the humidified N₂ within canister 12 at atmospheric pressure. Valve 54 is then closed, which shuts off water vapor flowing through apparatus 10 while allowing excess pressure in intermediate vessel 76 to be vented by vent 75. This rapidly dries out apparatus 10, and when dew point sensor 14 indicates 0° C., a state of very low relative humidity, valve 40 is closed. This process removes potentially damaging moisture from the lines and valves of apparatus 10. Valve 30 is then closed, and power is disconnected and all other valves are closed, water is emptied from reservoir 18 by opening drain 114, and the various hoses and cables are disconnected and placed in storage compartment 20 of apparatus 10 (FIG. 3).

From the foregoing, it is apparent that the applicants have provided an apparatus which can selectively humidify a gas with a high degree of precision. Further, this invention may be used to provide a regulated, leak-indicating gas to a vessel being tested.

We claim:

1. An apparatus for generating and directing a mixture of gases to a container for provision of a controlled atmosphere therein and comprising:
   an ejector having a low pressure region therein;
   a source of primary, pressurized motive gas connected to said ejector for supersonic flow therethrough;
   a source of secondary gas for mixing with said primary gas in said low pressure region of said ejector;
   first flow control means for controlling flow of said primary gas;
   second flow control means for controlling flow of said secondary gas to said ejector;
   sensor means for measuring and indicating dew point temperature at a point intermediate said ejector and said container; and
   means for manually controlling dew point of mixed gases responsive to temperature variations therein to observed provide a precise, selected atmosphere to said container.

2. An apparatus as set forth in claim 1 wherein said controlled atmosphere is a wet atmosphere.

3. An apparatus as set forth in claim 2 wherein said primary gas is an inert gas, including nitrogen.

4. An apparatus as set forth in claim 3 wherein said second gas is water vapor.

5. An apparatus as set forth in claim 4 wherein said first flow control means includes an ejector supply line connected to said source of primary gas and to said ejector, and valve means mounted in said supply line for controlling primary gas flow therethrough.

6. An apparatus as set forth in claim 5 wherein said second flow control means includes a regulating valve for controlling flow of said water vapor to said ejector.

7. An apparatus as set forth in claim 5, wherein said second flow control means includes a reservoir of water and a controllable heater disposed for providing a temperature therein which yields a saturation pressure in said reservoir greater than suction capability of said ejector.

8. An apparatus as set forth in claim 6 wherein said primary, pressurized motive gas is a leak-revealing gas, including a gas of the class of clorofluorocarbons, whereby flow of said water vapor to said low pressure region may be discontinued, allowing said container to be selectively pressurized with a dry, leak-revealing gas.

9. An apparatus as set forth in claim 8 wherein dew point of said mixture of gases provided to said container is adjusted by regulating flow of said water vapor to said ejector.

10. An apparatus as set forth in claim 8 wherein dew point of said mixture of gases provided to said container is adjusted by regulating pressure of said primary gas.

11. An apparatus as set forth in claim 8 comprising a plurality of pressure indicating means with discrete ones of said plurality of pressure indicating means being coupled to:
    said source of primary gas for indicating pressure thereof;
    a region upstream said ejector for indicating pressure of gas entering said ejector;
    said low pressure region for indicating negative pressure thereof;
    a region upstream said dew point sensor for indicating pressure of said mixture; and
    a region upstream from said container for indicating the pressure therein.

12. An apparatus as set forth in claim 11 having a distribution circuit for directing flow of said mixture, said circuit comprising:
    a first valve disposed downstream said dew point sensor and having at least two gas directing positions, with one position of said valve discharging said mixture to said container;
    a four-way union coupled to the other position of said first valve, said union having first, second, and third gas discharging ports;
    a second valve coupled between said first port and the container for permitting flow from said container to said four-way union;
    a third valve coupled between said second port and to a vent for directing flow from said external container through said second valve, said four-way union, said third valve, and out said vent; and
    a throttle valve coupled to said third port and disposed for connecting a vacuum pump thereto for evacuating said container and drawing gas therethrough.

* * * * *